(12) United States Patent
Gruhlke et al.

(10) Patent No.: US 11,907,342 B2
(45) Date of Patent: Feb. 20, 2024

(54) SELECTION OF AUTHENTICATION FUNCTION ACCORDING TO ENVIRONMENT OF USER DEVICE

(71) Applicant: QUALCOMM Incorporated, San Diego, CA (US)

(72) Inventors: Russell Gruhlke, San Jose, CA (US); Naga Chandan Babu Gudivada, Hyderabad (IN); Vishnu Vardhan Kasilya Sudarsan, Bangalore (IN); Sumeet Kumar Sahu, Bangalore (IN); Ravishankar Sivalingam, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 16/949,945

(22) Filed: Nov. 20, 2020

(65) Prior Publication Data
US 2022/0164421 A1 May 26, 2022

(51) Int. Cl.
*G06F 21/31* (2013.01)

(52) U.S. Cl.
CPC .................................... *G06F 21/31* (2013.01)

(58) Field of Classification Search
CPC ......... G06F 21/31; G06F 21/36; G06F 3/0482
See application file for complete search history.

(56) References Cited

U.S. PATENT DOCUMENTS

| | | | | |
|---|---|---|---|---|
| 7,697,729 | B2 * | 4/2010 | Howell | G06V 40/13 345/173 |
| 8,504,842 | B1 * | 8/2013 | Meacham | G06F 21/36 726/16 |
| 9,355,231 | B2 * | 5/2016 | Disraeli | H04L 63/083 |
| 10,237,396 | B2 * | 3/2019 | Li | H04M 1/72457 |
| 10,386,960 | B1 * | 8/2019 | Smith | G06F 1/1643 |
| 10,395,018 | B2 * | 8/2019 | Turgeman | G06F 3/017 |
| 10,701,067 | B1 * | 6/2020 | Ziraknejad | H04W 12/63 |
| 10,795,984 | B1 | 10/2020 | Rafferty et al. | |
| 11,256,792 | B2 * | 2/2022 | Tussy | G06Q 20/3276 |
| 11,263,303 | B1 * | 3/2022 | Fridgren | G06F 21/36 |

(Continued)

FOREIGN PATENT DOCUMENTS

| CN | 107735999 A | 2/2018 |
|---|---|---|
| WO | WO-2015062382 A1 | 5/2015 |

OTHER PUBLICATIONS

International Search Report and Written Opinion—PCT/US2021/071601—ISA/EPO—dated Jan. 7, 2022.

*Primary Examiner* — Kambiz Zand
*Assistant Examiner* — Afaq Ali
(74) *Attorney, Agent, or Firm* — QUALCOMM Incorporated

(57) ABSTRACT

In some aspects, a user device may detect an authentication event associated with unlocking the user device. The user device may determine, based at least in part on sensor data from a sensor of the user device, an environmental context of the user device. The user device may select, from a plurality of authentication functions of the user device, an authentication function based at least in part on the environmental context of the user device. The user device may activate an authentication component that is associated with the authentication function to authenticate a user in association with unlocking the user device. Numerous other aspects are provided.

30 Claims, 9 Drawing Sheets

(56) References Cited

U.S. PATENT DOCUMENTS

| | | | | |
|---|---|---|---|---|
| 11,330,012 | B2* | 5/2022 | Turgeman | H04L 67/306 |
| 2006/0027898 | A1* | 2/2006 | Buer | G06V 40/1306 |
| | | | | 257/618 |
| 2014/0123275 | A1* | 5/2014 | Azar | G06V 10/772 |
| | | | | 726/19 |
| 2015/0180543 | A1* | 6/2015 | Verma | G06F 1/1694 |
| | | | | 455/41.1 |
| 2015/0213252 | A1* | 7/2015 | Wilairat | G06F 21/36 |
| | | | | 726/17 |
| 2016/0294823 | A1* | 10/2016 | McKeithan, II | G06F 1/1694 |
| 2016/0359827 | A1* | 12/2016 | Krishnaiah | H04L 63/102 |
| 2016/0371529 | A1* | 12/2016 | Bhagavat | G06V 40/1329 |
| 2016/0378076 | A1* | 12/2016 | Hill | G05B 19/4184 |
| | | | | 700/28 |
| 2017/0195957 | A1* | 7/2017 | Debates | H04W 52/0254 |
| 2018/0060632 | A1* | 3/2018 | Knabenshue | G06F 1/1607 |
| 2018/0285544 | A1 | 10/2018 | Chang et al. | |
| 2019/0220583 | A1 | 7/2019 | Douglas et al. | |
| 2019/0236391 | A1* | 8/2019 | Novik | G06F 18/217 |
| 2019/0278901 | A1* | 9/2019 | Lewis | G06F 3/04842 |
| 2020/0342076 | A1 | 10/2020 | Alameh et al. | |
| 2020/0364716 | A1* | 11/2020 | Pickering | G06F 21/44 |
| 2021/0019437 | A1* | 1/2021 | Neves Creto | G06F 1/1684 |

\* cited by examiner

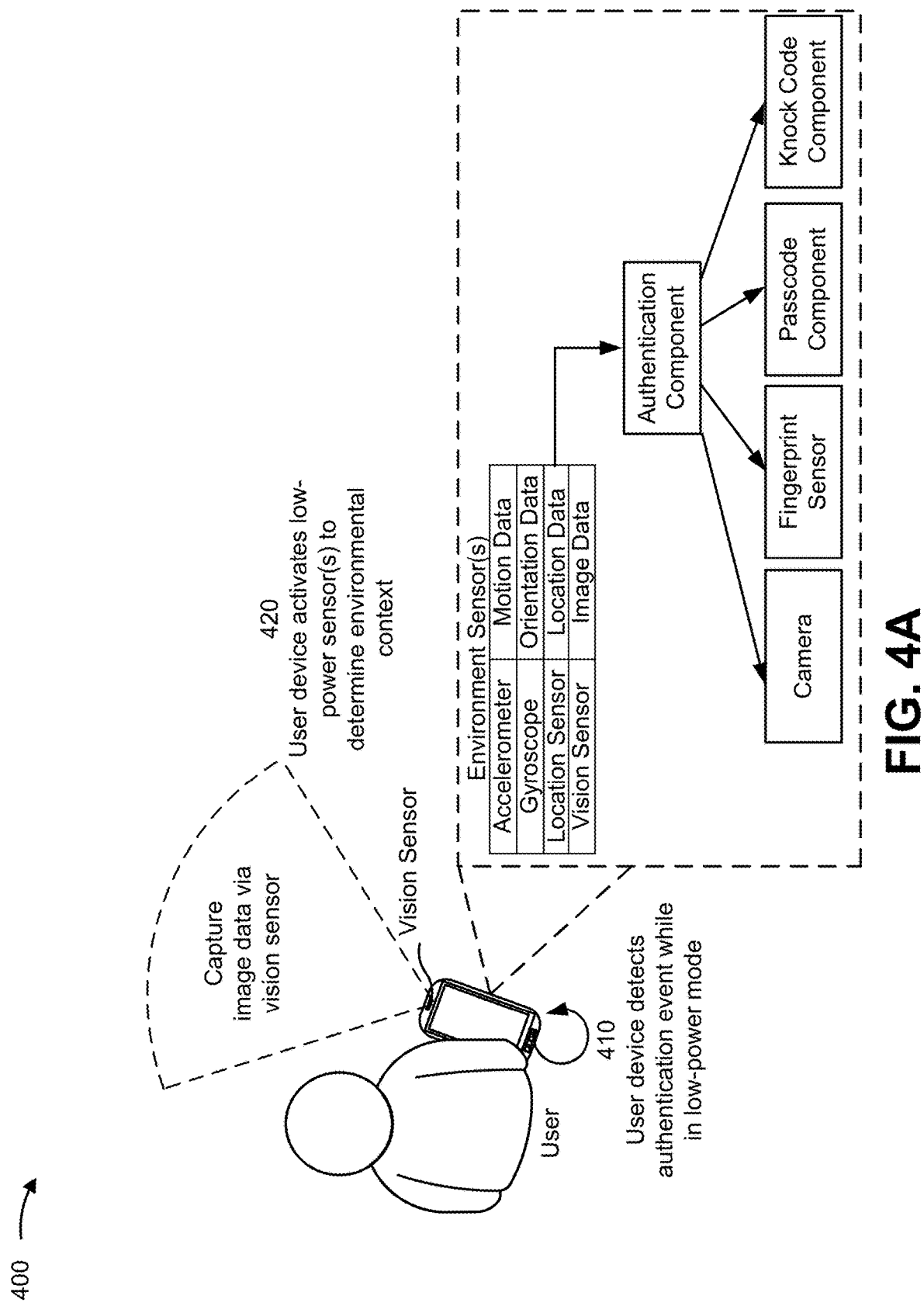

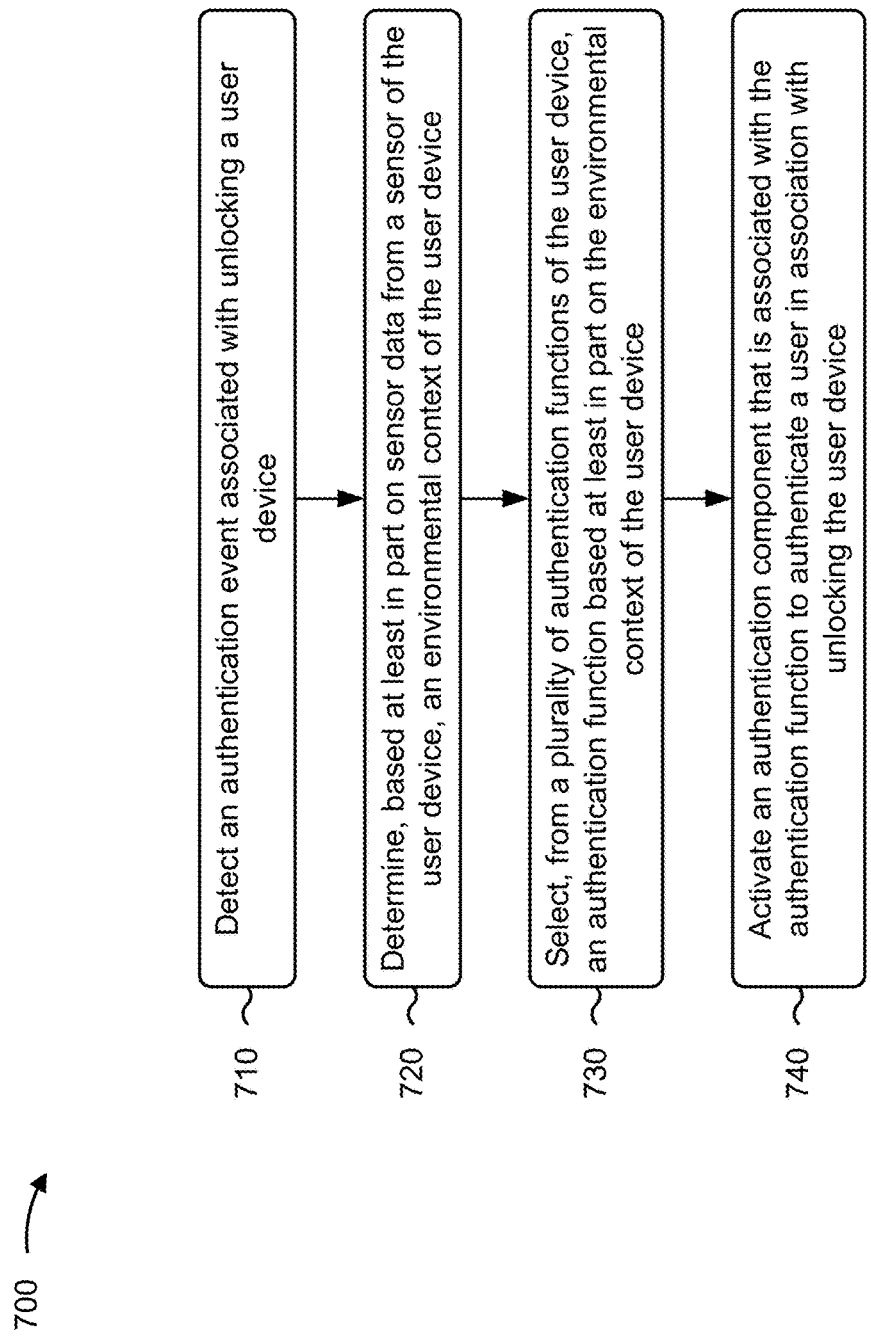

SELECTION OF AUTHENTICATION FUNCTION ACCORDING TO ENVIRONMENT OF USER DEVICE

FIELD OF THE DISCLOSURE

Aspects of the present disclosure generally relate to user devices and, for example, to selection of an authentication function according to an environment of a user device.

BACKGROUND

Sensors are used within user devices for various purposes. Such sensors may be used to sense one or more characteristics associated with the user device. Such characteristics may include one or more characteristics of an environment of the user device. For example, one or more sensors may be configured to detect whether a user is present, detect motion, measure ambient lighting, and/or the like.

SUMMARY

In some aspects, a method includes detecting an authentication event associated with unlocking a user device; determining, based at least in part on sensor data from a sensor of the user device, an environmental context of the user device; selecting, from a plurality of authentication functions of the user device, an authentication function based at least in part on the environmental context of the user device; and activating an authentication component that is associated with the authentication function to authenticate a user in association with unlocking the user device.

In some aspects, a device includes one or more memories; and one or more processors, communicatively coupled to the one or more memories, configured to: detect an authentication event associated with unlocking a user device; determine, based at least in part on sensor data from a sensor of the user device, an environmental context of the user device; select, from a plurality of authentication functions of the user device, an authentication function based at least in part on the environmental context of the user device; and activate an authentication component that is associated with the authentication function to authenticate a user in association with unlocking the user device.

In some aspects, a non-transitory computer-readable medium storing a set of instructions includes one or more instructions that, when executed by one or more processors of a device, cause the device to: detect an authentication event associated with unlocking a user device; determine, based at least in part on sensor data from a sensor of the user device, an environmental context of the user device; select, from a plurality of authentication functions of the user device, an authentication function based at least in part on the environmental context of the user device; and activate an authentication component that is associated with the authentication function to authenticate a user in association with unlocking the user device.

In some aspects, an apparatus includes means for detecting an authentication event associated with unlocking a user device; means for determining, based at least in part on sensor data from a sensor of the user device, an environmental context of the user device; means for selecting, from a plurality of authentication functions of the user device, an authentication function based at least in part on the environmental context of the user device; and means for activating an authentication component that is associated with the authentication function to authenticate a user in association with unlocking the user device.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6 and 7 are diagrams illustrating example processes performed, for example, by a user device, in accordance with various aspects of the present disclosure.

DETAILED DESCRIPTION

Figure 1:
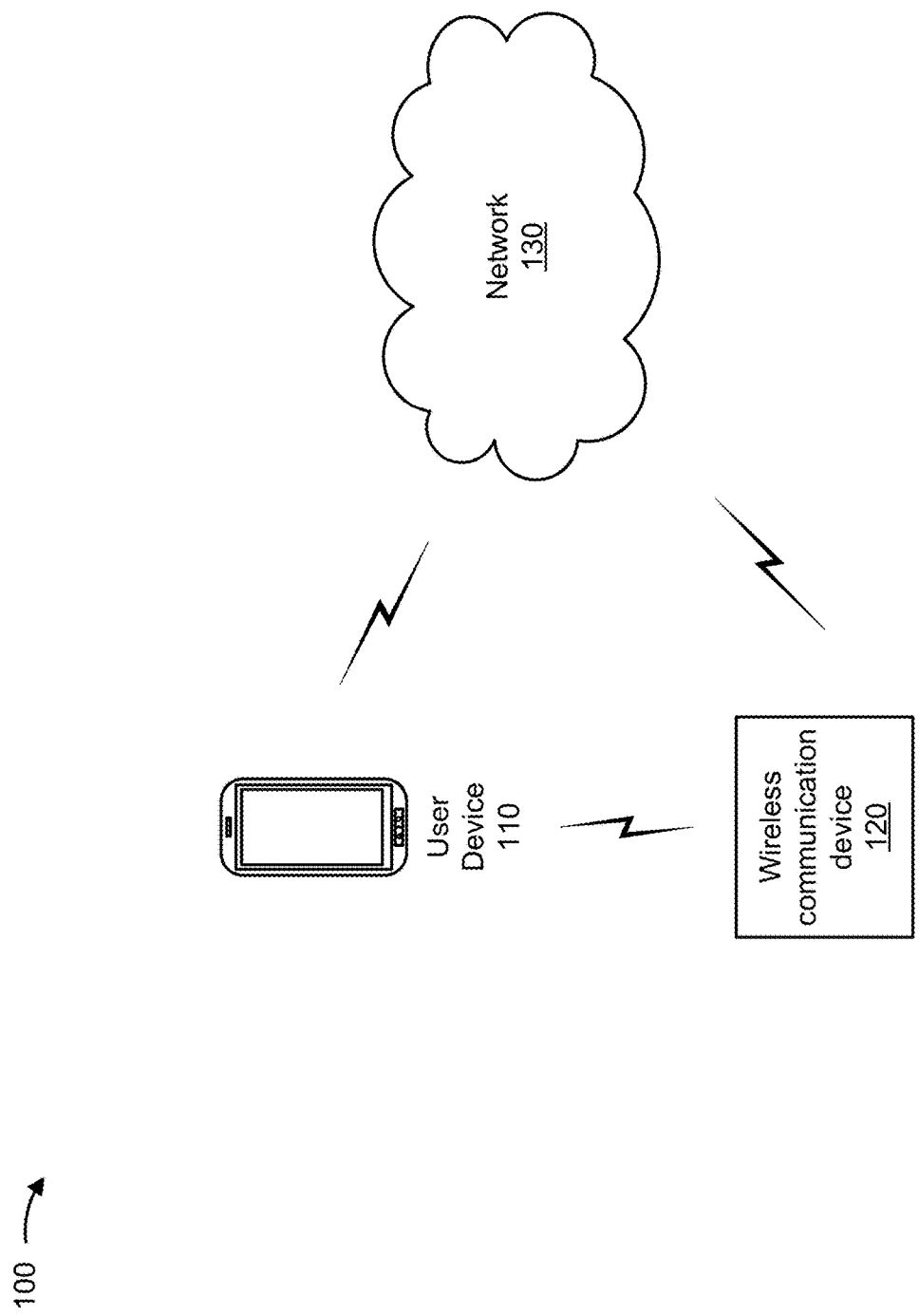
FIG. 1 is a diagram illustrating an example environment in which a user device described herein may be implemented, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Many user devices (e.g., mobile devices, computers, wearable devices, and/or the like) may include an authentication component configured to perform an authentication function (e.g., a facial recognition authentication function, a pattern recognition authentication function, a personal identification number (PIN) recognition authentication function, a fingerprint recognition authentication function, a knock code authentication function, and/or the like) to authenticate the user prior to enabling access to the user device for the user (e.g., prior to unlocking the user device).

For example, a facial recognition authentication function may be performed to unlock a display of the user device to permit a particular user to interact with the user device. In some cases, the user device may utilize multiple authentication components and/or authentication functions. For example, the user device may initially utilize a primary authentication function (e.g., a facial recognition authentication function) to authenticate the user. If the primary authentication function fails to authenticate the user, the user device may utilize a secondary authentication function (e.g., a PIN recognition function) to authenticate the user.

However, the environmental context of the user device (e.g., whether the user device is still or in motion, an amount of ambient lighting, a physical orientation of the user device, a position of the user's finger relative to a fingerprint sensor, and/or the like) may prevent the primary authentication function from authenticating the user. Thus, the user device may waste computing resources (e.g., processing resources, memory resources, communication resources, and/or the like) attempting to authenticate the user utilizing the primary authentication function prior to utilizing the secondary authentication function to authenticate the user.

Some aspects described herein relate to a user device that selects an authentication function according to an environmental context associated with the user device. For example, a user device may detect an authentication event associated with unlocking the user device. The authentication event may include a particular movement of the user device (e.g., the user device being raised upwards, the user device being rotated from a horizontal orientation to a vertical orientation, and/or the like), a user input, and/or the like. The user device may determine, based at least in part on sensor data from a sensor of the user device, the environmental context of the user device. For example, the user device may determine whether the user device is in motion, a location of the user device, an orientation of the user device, a position of the user's finger relative to a fingerprint sensor of the user device, and/or the like. The user device may select, from a plurality of authentication functions of the user device, an authentication function based at least in part on the environmental context of the user device. The user device may activate an authentication component that is associated with the authentication function to authenticate a user in association with unlocking the user device.

In this way, the user device may conserve computing resources that otherwise would have been wasted utilizing an authentication function selected based on being designated a primary authentication function rather than an authentication function selected based on the environmental context of the user device.

FIG. 1 is a diagram illustrating an example environment 100 in which an authentication device described herein may be implemented, in accordance with various aspects of the present disclosure. As shown in FIG. 1, environment 100 may include a user device 110, a wireless communication device 120, and/or a network 130. Devices of environment 100 may interconnect via wired connections, wireless connections, or a combination of wired and wireless connections.

User device 110 includes one or more devices capable of including one or more authentication components described herein. For example, user device 110 may include one or more devices capable of receiving, generating, storing, processing, and/or providing information associated with one or more authentication components described herein. More specifically, user device 110 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Similar to user device 110, wireless communication device 120 includes one or more devices capable of receiving, generating, storing, processing, and/or providing information associated with one or more authentication components described herein. For example, wireless communication device 120 may include a base station, an access point, and/or the like. Additionally, or alternatively, similar to user device 110, wireless communication device 120 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Network 130 includes one or more wired and/or wireless networks. For example, network 130 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 1 are provided as one or more examples. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
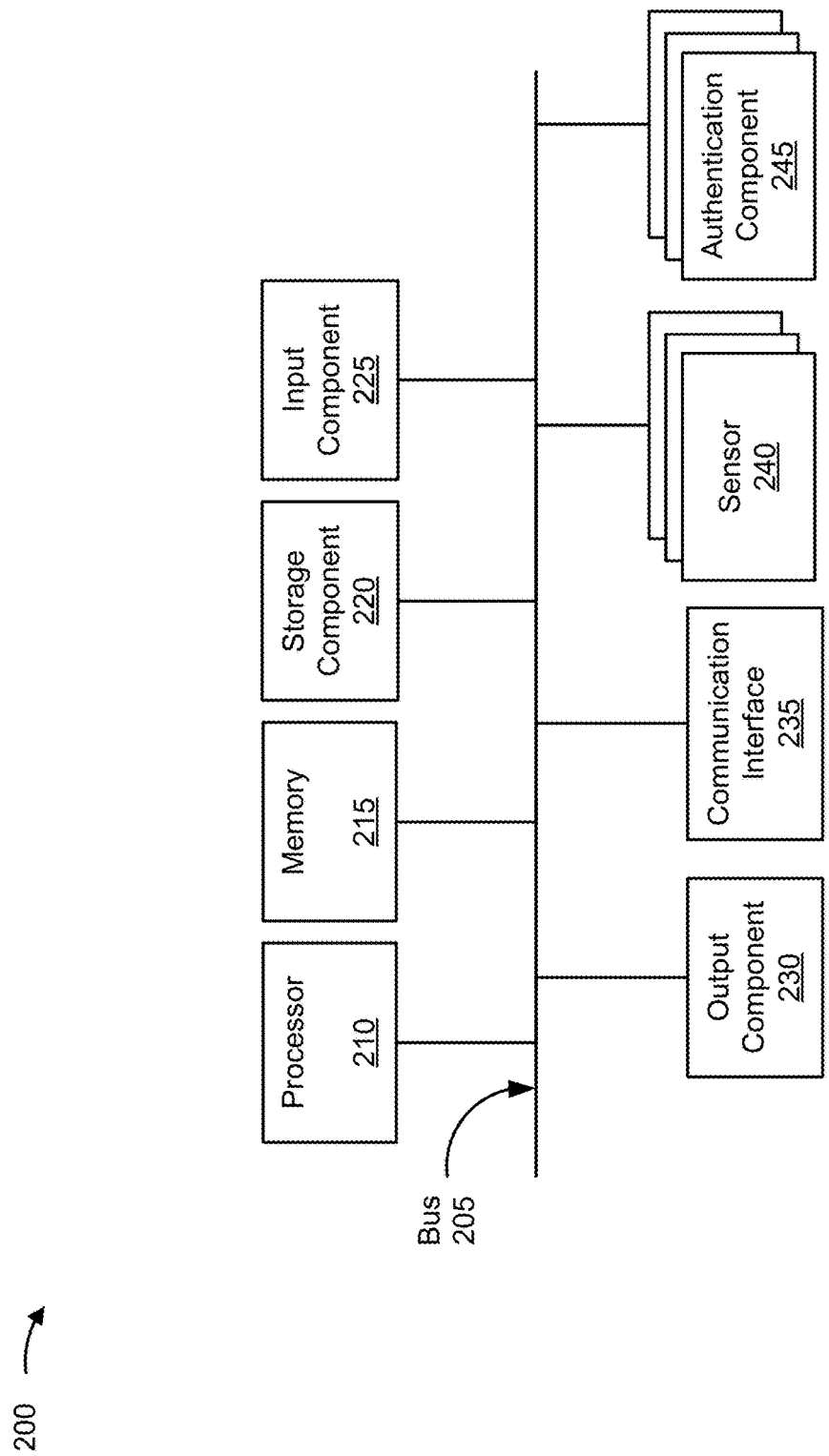
FIG. 2 is a diagram illustrating example components of one or more devices shown in FIG. 1, such as a user device and/or a wireless communication device, in accordance with various aspects of the present disclosure.

FIG. 2 is a diagram illustrating example components of a device 200, in accordance with various aspects of the present disclosure. Device 200 may correspond to user device 110 and/or wireless communication device 120. In some aspects, user device 110 and/or wireless communication device 120 may include one or more devices 200 and/or one or more components of device 200. As shown in FIG. 2, device 200 may include a bus 205, a processor 210, a memory 215, a storage component 220, an input component 225, an output component 230, a communication interface 235, one or more sensors 240 (referred to individually as a "sensor 240" and collectively as "sensors 240"), and one or more authentication components 245 (referred to individually as a "authentication component 245" and collectively as "authentication components 245").

Bus 205 includes a component that permits communication among the components of device 200. Processor 210 is implemented in hardware, firmware, or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touchscreen display, a keyboard, a keypad, a mouse, a button, a switch, and/or a microphone). Additionally, or alternatively, input component 225 may include a component for determining a position or a location of device 200 (e.g., a global positioning system (GPS) component, a global navigation satellite system (GNSS) component, and/or the like) a sensor for sensing information (e.g., an accelerometer, a gyroscope, an actuator, another type of position or environment sensor, and/or the like)). Output component 230 includes a component that provides output information from device 200 (e.g., a display, a speaker, a haptic feedback component, an audio or visual indicator, and/or the like).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), a cellular network interface, and/or the like.

Sensor 240 includes one or more devices capable of sensing characteristics associated with device 200. Sensor 240 may include one or more integrated circuits (e.g., on a packaged silicon die) and/or one or more passive components of one or more flex circuits to enable communication with one or more components of device 200.

Sensor 240 may include an optical sensor that has a field of view in which sensor 240 may determine one or more characteristics of an environment of device 200. In some aspects, sensor 240 may include a camera. For example, sensor 240 may include a low-resolution camera (e.g., a video graphics array (VGA)) that is capable of capturing images that are less than one megapixel, images that are less than 1216×912 pixels, and/or the like. Sensor 240 may be a low-power device (e.g., a device that consumes less than ten milliwatts (mW) of power) that has an always-on capability (e.g., to permit always-on facial detection, always-on character recognition, always-on object detection, and/or the like) while device 200 is powered on.

Additionally, or alternatively, sensor 240 may include magnetometer (e.g., a Hall effect sensor, an anisotropic magnetoresistive (AMR) sensor, a giant magnetoresistive sensor (GMR), and/or the like), a location sensor (e.g., a global positioning system (GPS) receiver, a local positioning system (LPS) device (e.g., that uses triangulation, multi-lateration, etc.), and/or the like), a gyroscope (e.g., a micro-electro-mechanical systems (MEMS) gyroscope or a similar type of device), an accelerometer, a vision sensor, a speed sensor, a motion sensor, an infrared sensor, a temperature sensor, a pressure sensor, and/or the like.

Authentication component 245 includes one or more devices capable of performing an authentication function to authenticate a user of device 200. Authentication component 245 may include one or more integrated circuits (e.g., on a packaged silicon die) and/or one or more passive components of one or more flex circuits to enable communication with one or more components of device 200. Authentication component 245 may include a facial recognition authentication component, a fingerprint recognition authentication component, a pattern recognition authentication component, a PIN recognition authentication component, a knock code recognition authentication component, and/or another type of authentication component.

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, device 200 may include means for detecting an authentication event associated with unlocking a user device; means for determining, based at least in part on sensor data from a sensor of the user device, an environmental context of the user device; means for selecting, from a plurality of authentication functions of the user device, an authentication function based at least in part on the environmental context of the user device; means for activating an authentication component that is associated with the authentication function to authenticate a user in association with unlocking the user device; and/or the like. In some aspects, such means may include one or more components of device 200 described in connection with FIG. 2, such as bus 205, processor 210, memory 215, storage component 220, input component 225, output component 230, communication interface 235, sensor 240, authentication component 245, and/or the like.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
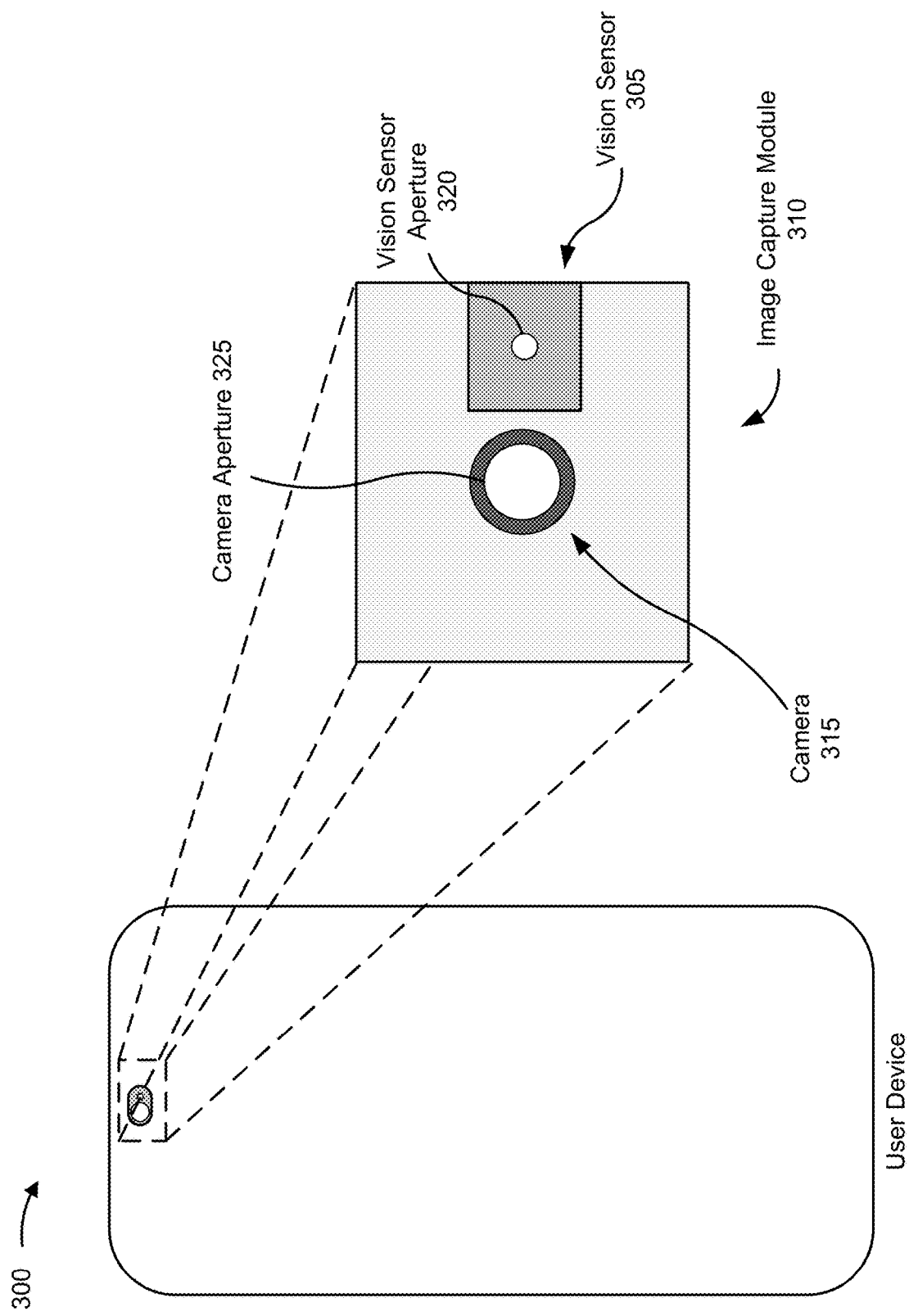
FIGS. 3-5 are diagrams illustrating examples associated with selection of an authentication function according to an environment of a user device, in accordance with various aspects of the present disclosure.

FIG. 3 is a diagram illustrating an example of a user device 300 that includes a vision sensor 305 in accordance with various aspects of the present disclosure. As shown in the example of FIG. 3, user device 300, which may correspond to user device 110, includes an image capture module 310. Although, the image capture module 310 of FIG. 3 includes vision sensor 305 and a camera 315, other configurations of image capture module 310 and/or other configurations of vision sensor 305 and camera 315 are possible. For example, vision sensor 305 and camera 315 may be combined or arranged as a single device (e.g., a single camera with a low-power, low-resolution mode and a high-power, high-resolution mode). In the following examples, camera 315 may be a high-resolution camera and vision sensor 305 may be a low-power and/or low-resolution camera, as described herein.

Vision sensor 305 may be any suitable sensor that is capable of optically sensing one or more characteristics of an environment of image capture module 310 (which may be the same environment as an environment of user device 300, once installed in the user device). For example, vision sensor 305 may be a low-resolution camera, an optical sensor capable of detecting light (e.g., ambient light, infrared light, an optical communication signal, and/or the like), an infrared sensor, and/or the like.

Vision sensor 305 of image capture module 310 may be a low-power sensor that requires less than 10 mW of power to operate. Vision sensor 305 may require less power than camera 315 of image capture module 310. For example, vision sensor 305 may be a low-resolution camera that requires less than 10 mW (e.g., 1 mW, 2 mW, 5 mW, and/or the like) to capture an image and/or video of the environment via a vision sensor aperture 320. In this way, vision sensor 305 may enable an always-on detection capability that enables one or more entities (e.g., an optical character, an object, an individual, and/or the like) to be detected without the user interacting with a user interface of user device 300, without picking up (and/or touching) the user device, and/or the like.

Additionally, or alternatively, vision sensor 305 may include an infrared sensor that facilitates always-on detection when the environment of the image capture module is dark. For example, a device associated with image capture module 310 may include a low-power light emitter that emits infrared light, and vision sensor 305 may sense reflections of the emitted light that can be analyzed (e.g., to detect an entity).

As described herein, vision sensor 305 may be configured to have an always-on capability to detect one or more entities in an environment of user device 300 (e.g., within a field of view of vision sensor 305). For example, the always-on capability may permit vision sensor 305, once powered on and/or activated (e.g., when the vision sensor is in an always-on mode), to continuously monitor the environment of user device 300 for a particular entity without instruction from a user, without the user device receiving a user input (e.g., via a user interface of the user device) associated with detecting the entity, without the user unlocking a lock screen of the user device, without the user activating vision sensor 305 and/or camera 315, and/or the like. Accordingly, such always-on capability may facilitate an always-on character detection capability (e.g., to detect one or more particular types of optical characters), an always-on facial recognition (e.g., to detect the user and/or one or more individuals in a field of view of the vision sensor), an always-on object detection capability (e.g., to detect one or more particular types of objects, such as a finger of a user, a structure, and/or a vehicle, among other particular types of objects), and/or the like.

In some aspects, as described herein, based at least in part on detecting an entity using the always-on capability of vision sensor 305, vision sensor 305 may analyze (and/or may trigger, without a user interaction or instruction, user device 300 to analyze) the entity (e.g., via an image processing model) and/or perform one or more actions associated with user device 300 (e.g., activate camera 315 to capture an image, obtain information associated with the optical character, and/or the like). Further, vision sensor 305, in always-on detection mode, may record a sliding window of images captured by vision sensor 305. For example, the sliding window of images may be stored as pre-roll video (e.g., video that is captured in a time period before and/or during detection of an entity). Accordingly, the sliding window of images can be saved as pre-roll video that can be accessed, via the user device, by a user (e.g., to permit the user to playback the pre-roll video to view the entity detected by the vision sensor).

Camera 315 of user device 300 may be a high-resolution camera that includes a camera aperture 325 and is powered by a power supply (e.g., a battery) when installed within user device 300. As a high-resolution camera, camera 315 may require 100 mW of power or more to capture images and/or video. Camera 315 may be communicatively coupled to a device (e.g., processor 210, input component 225, and/or the like) via a communication bus (e.g., bus 205) to permit camera 315 to be controlled and/or to provide captured images to the device. Although some aspects described herein may describe vision sensor 305 as a separate device from camera 315, vision sensor 305 and camera 315 may be a same device. For example, vision sensor 305 may correspond to camera 315 being in a low-power mode and/or a low-resolution mode. In such a case, camera 315 may operate in an always-on detection mode to detect and/or identify one or more entities while user device 300 is in a locked state (e.g., a user interface is in a locked state and/or is configured to display a lock screen of user device 300) and/or without performing an unlock operation to open an application associated with camera 315.

In some aspects, image capture module 310 may be formed from and/or configured to include a separable camera module for camera 315 and/or a separable sensor module for vision sensor 305. The sensor module may be attached (e.g., fastened, fixed, connected, glued, and/or the like) to the camera module (e.g., a structure of the camera module) to form image capture module 310. Additionally, or alternatively, the sensor module and the camera module may be attached to a structure of image capture module 310 and/or user device 300 to form image capture module 310. In this way, image capture module 310 may be installed (e.g., prior to installing the display surface) within user device 300 as a single assembled unit or as separable units.

In example 300, image capture module 310 may be installed on a side of user device 300, referred to herein as a backside, that is opposite of a side of user device 300 that includes a display (e.g., display side), such as a touchscreen, of user device 300. For example, the display on the display side may permit a user to view an image that has been captured and/or an image being captured (in real-time) by camera 315 (and/or the vision sensor 305). Furthermore, one or more user interfaces (e.g., buttons, touchscreen, and/or the like) may be positioned on the display side to permit the user to control one or more features of camera 315 (e.g., zoom, focus, aspect ratio, resolution, and/or the like). As described herein, the user may control camera 315 via an application that is installed on user device 300 and enables user control of camera 315. In this way, a field of view of camera 315 and/or vision sensor 305 of FIG. 3 may be directed away from a user handling (e.g., holding, gripping, supporting (e.g., via a wearable user device support, such as a strap, a band, an article of clothing, and/or the like)) user device 300. Accordingly, the field of view of camera 315 and/or vision sensor 305 may be configured on user device 300 to prevent the user from blocking the field of view of camera 315 and/or vision sensor 305, to permit the user to see the field of view of camera 315, to permit the user to interact with camera 315, and/or the like.

In this way, the user device may include an image capture module with a camera and a vision sensor with always-on capability to permit the vision sensor to detect an entity (e.g., an optical character, an object, and/or the like) in the field of view of the vision sensor and perform one or more actions (without instruction from the user) associated with the entity.

As indicated above, FIG. 3 is provided as an example. Other examples are possible and may differ from what is described above in connection with FIG. 3.

Figure 4B:
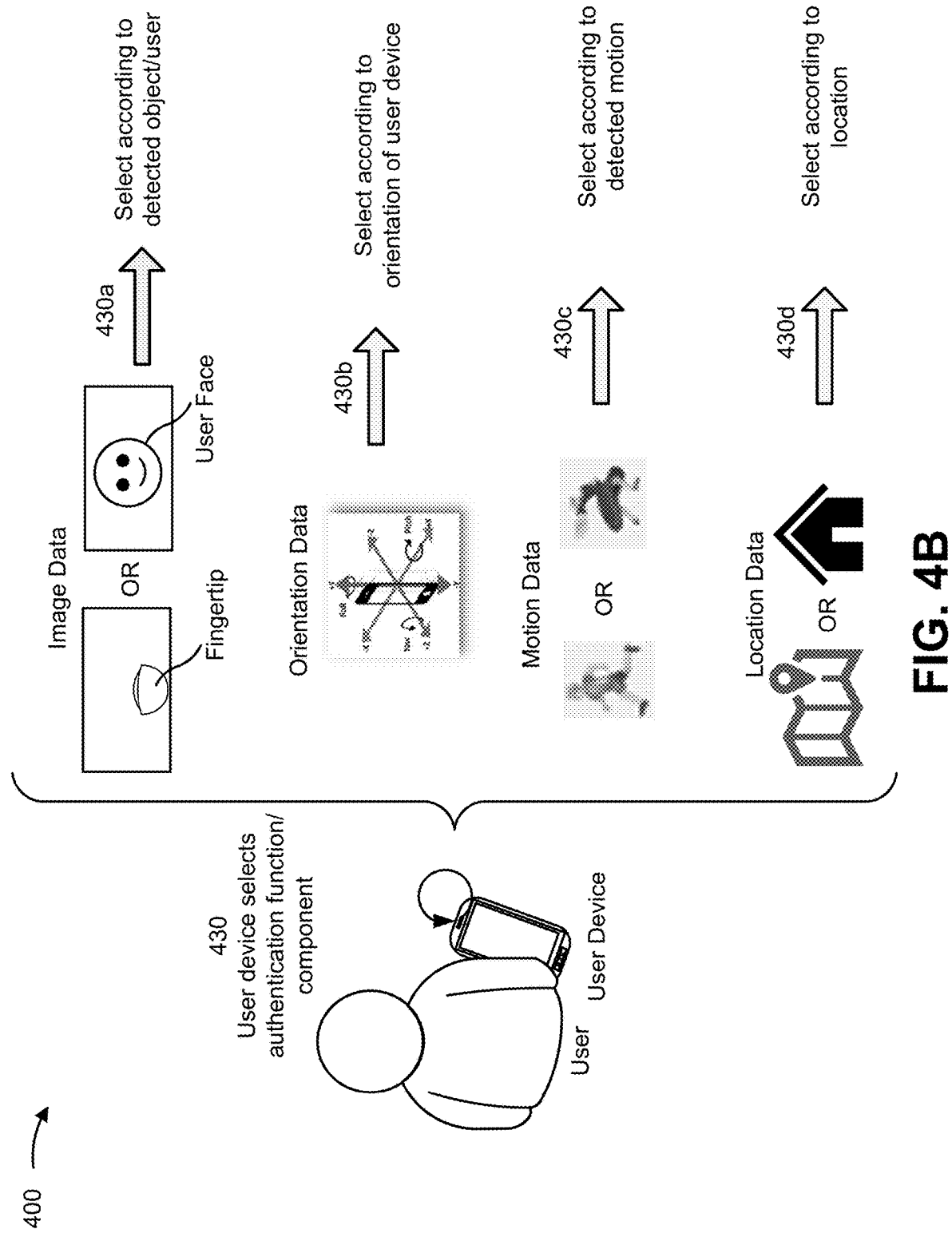
Figure 4C:
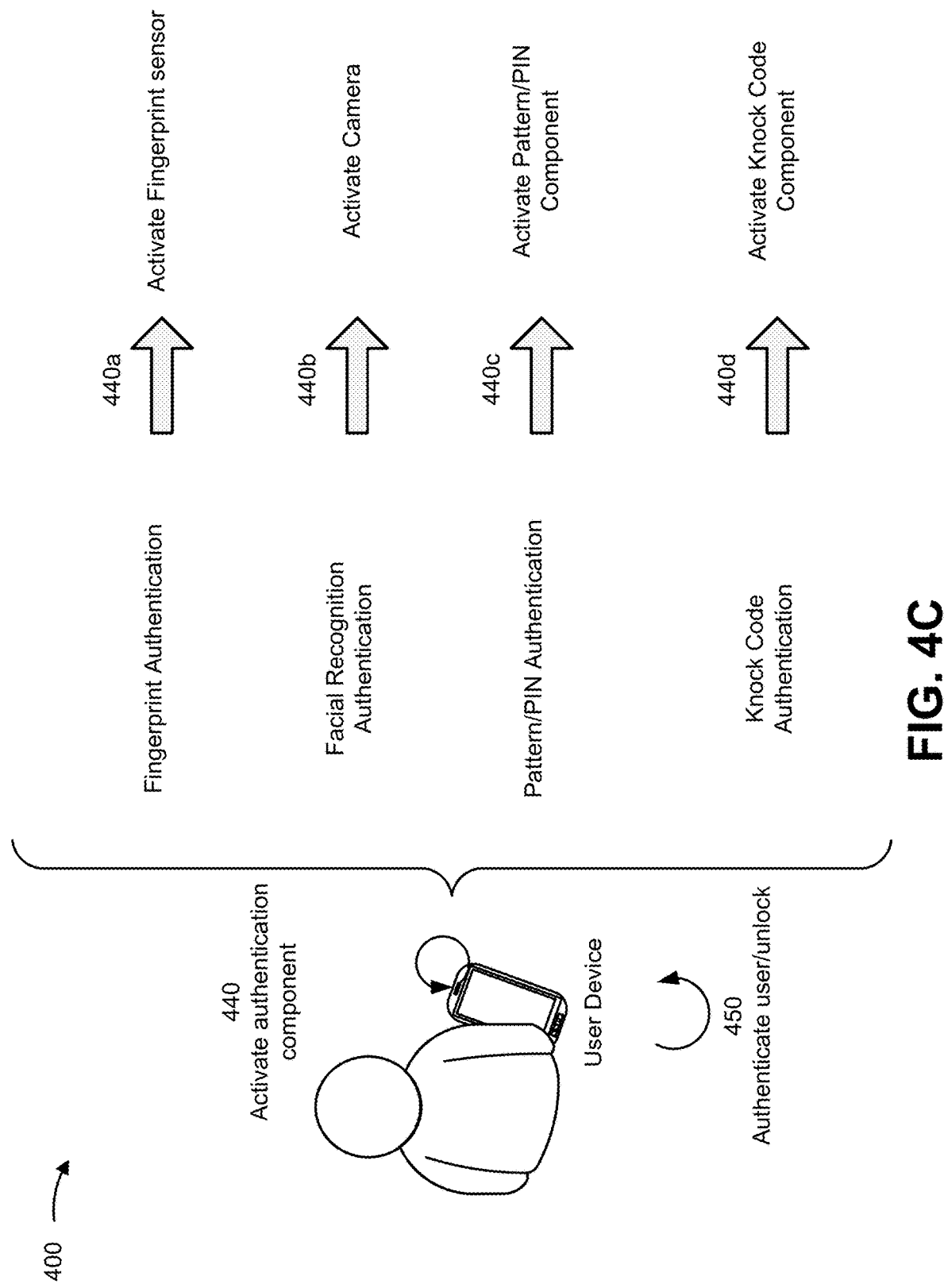

FIGS. 4A-4C are diagrams illustrating an example 400 associated with selection of an authentication function according to an environment of a user device, in accordance with various aspects of the present disclosure. As shown in FIGS. 4A-4C, example 400 includes a user device associated with a user. The user device may correspond to the user device of example 300, and thereby, may include a camera and a vision sensor, as described herein. While some aspects described herein are described in conjunction with the vision sensor being a separate device from the camera, the vision sensor and the camera may be a same device. For example, the vision sensor may correspond to the camera when in a low-power mode (e.g., that permits always-on detection capability) and/or a low-resolution mode (e.g., that conserves processing resources).

As shown in FIG. 4A, and by reference number 410, the user device detects an authentication event while in a low-power mode. The user device may be in the low-power mode based on the user device performing a lock operation to lock the user device. Locking the user device may prevent access to an application of the user device, a home screen of the user device, and/or the like. The authentication event may be associated with unlocking the user device (e.g., to access the application of the user device, the home screen of the user device, and/or the like).

In some aspects, the user device may detect the authentication event based on detecting an interaction, by the user, with an input component of the user device. For example, the user device may detect the authentication event based on detecting a touch on a touchscreen of the user device, an input of a key on a keypad of the user device, an input of a button of the user device, and/or the like.

In some aspects, the user device may detect the authentication event based on detecting a motion of the user device associated with the authentication event. The user device may utilize a sensor (e.g., an accelerometer, a gyroscope, and/or the like) of the user device to obtain motion data associated with a movement of the user device associated with the authentication event. For example, the user device may detect, based on the motion data, the user device moving in an upward direction, the user device rotating from a horizontal orientation to a vertical orientation, and/or the like.

In some aspects, the user device may detect the authentication event based on detecting, via low-resolution image data obtained by the vision sensor, that the user is interacting with the user device. For example, the vision sensor may capture an image of a field of view of the vision sensor. The vision sensor may perform an analysis (e.g., an object analysis, a facial recognition analysis, and/or the like) on the captured image to determine whether a particular object (e.g., a finger of the user, a face of the user, and/or the like) is depicted in the image. The user device may detect the authentication event based on the particular object being depicted in the image.

As shown by reference number 420, the user device actives one or more low-power sensors to determine an environmental context associated with the user device. The environmental context may be whether the user device is still or in motion, a physical orientation of the user device, a location of the user device, an amount of ambient light surrounding the user device, a location of an object relative to the user device (e.g., a location of the user's finger relative to a fingerprint sensor), and/or the like. The one or more low-power sensors may facilitate an always-on environmental context detection capability when the user device is locked. As shown in FIG. 4A, the one or more low-power sensors include an accelerometer, a gyroscope, a location sensor, and a vison sensor.

The accelerometer may obtain motion data indicating a motion of the user device. For example, the accelerometer may obtain motion data indicating that the user device is moving in an upwards direction, that the user device is moving in a downwards direction, and/or the like.

The gyroscope may obtain orientation data indicating an orientation of the user device. For example, the gyroscope may obtain orientation data indicating that the user device is in a horizontal orientation, a vertical orientation, is being rotated from the horizontal orientation to the vertical orientation, is being rotated from the vertical orientation to the horizontal orientation, and/or the like.

The location sensor may obtain location data indicating a location of the user device. For example, the location sensor may obtain global positioning system (GPS) data indicating a geographic location (e.g., a latitude, a longitude, and/or the like) of the user device. As another example, the location sensor may obtain data identifying a network to which the user device is connected. The location sensor may determine the location of the user device based on the network to which the user device is connected. For example, the location sensor may determine that the user device is connected to a wireless network associated with a home of the user. The location sensor may determine that the user device is located at the home of the user based on the user device being connected to the wireless network. The location sensor may generate location data indicating that the user device is located at the home of the user.

The vision sensor may obtain image data of a field of view associated with the vision sensor. For example, the vision sensor may obtain low-resolution image data in a manner similar to that described above with respect to FIG. 3.

The user device may determine the environmental context associated with the user device based on data obtained by the one or more low-power sensors. For example, the user device may determine the environmental context based on the motion data, the orientation data, the location data, and/or the image data. In some aspects, the user device may determine the environmental context based on a machine learning model. The machine learning model may be trained based on historical sensor data associated with corresponding historical usage and/or selections of one or more of a plurality of authentication functions associated with the user device. The machine learning model may analyze the data obtained by the one or more low-power sensors to generate an output. The output may include information indicating an environmental context associated with the user device and a score indicating measure of confidence that the environmental context is correct for the obtained data.

As shown in FIG. 4B, and by reference number 430, the user device selects an authentication component and/or an authentication function for authenticating the user. The user device may select the authentication component and/or the authentication function from a plurality of authentication components and/or authentication functions based on the environmental context associated with the user device.

In some aspects, the user device may determine that a default authentication function is to be bypassed based on the environmental context. For example, the default authentication function may be the facial recognition authentication function and the user device may determine that the facial recognition authentication function is to be bypassed based on the orientation of the user device being the horizontal orientation. The user device may prevent activation of a default authentication component that is associated with the default authentication function based on determining that the default authentication function is to be bypassed. The user device may select the authentication, from the plurality of authentication functions based on the environmental context and based on preventing the activation of the default authentication component.

In some aspects, the environmental context is a detected object and/or a user. As shown by reference number 430a, the user device selects the authentication component and/or the authentication function according to the detected object and/or the user. The data obtained by the one or more low-power sensors may include image data. The user device may perform object detection processing and/or facial recognition processing on the image data. The user device may determine that a finger of the user and/or a face of the user is depicted in the image data based on performing the object detection processing and/or the facial recognition processing. The user device may select the authentication component and/or the authentication function based on the finger of the user and/or the face of the user being depicted in the image data, as described in greater detail below with respect to FIG. 5.

In some aspects, the environmental context is an orientation of the user device. As shown by reference number 430b, the user device selects the authentication component and/or the authentication function based on the orientation of the user device. The data obtained by the one or more low-power sensors may include orientation data. The user device may determine an orientation of the user device based on the orientation data. For example, the orientation data may include data obtained by the gyroscope and/or the accelerometer. The data may indicate an angular velocity, a tilt, and/or an acceleration associated with the user device. The user device may determine the orientation of the user device based on the angular velocity, the tilt, and/or the acceleration of the user device.

In some aspects, the data obtained by the one or more low-power sensors includes image data and the user device determines the orientation of the user device based on the image data. The user device may utilize an object detection process to identify an object depicted in the image data. The user device may determine the orientation based on the object depicted in the image data. As an example, the object may be a light switch located on a wall. The user device may determine that a horizontal orientation of the user device may enable the one or more low-power sensors (e.g., the vision sensor) to capture an image that depicts the light switch on a wall. The user device may determine that the user device has a horizontal orientation based on the horizontal orientation enabling the one or more low-power sensors to capture the image depicting the light switch on the wall.

The user device may select the authentication component and/or the authentication function based on the orientation of the user device. As an example, the orientation of the user device may be a horizontal orientation. The user device may determine that user is not within a field of view of the camera used to obtain an image of the user for performing the facial recognition authentication function based on the orientation of the user device being the horizontal orientation. Alternatively, and/or additionally, the user device may determine that another type of authentication function (e.g., a fingerprint recognition authentication function, a pattern recognition authentication function, and/or a PIN recognition authentication function) is associated with the horizontal orientation. For example, the user may input preference information indicating that the fingerprint recognition authentication function is to be utilized to authenticate the user when the orientation of the user device is the horizontal orientation. The user device may select the other type of authentication function (e.g., the fingerprint recognition authentication function), rather than the facial recognition authentication function, based on the orientation of the user device being the horizontal orientation.

As another example, the orientation of the user device may be a vertical orientation. The user device may determine that user is within a field of view of the camera used to obtain an image of the user for performing the facial recognition authentication function based on the orientation of the user device being the vertical orientation. Alternatively, and/or additionally, the user device may determine that facial recognition authentication function is associated with the vertical orientation. For example, the user may input preference information indicating that the facial recognition authentication function is to be utilized to authenticate the user when the orientation of the user device is the vertical orientation. The user device may select the facial recognition authentication function based on the orientation of the user device being the vertical orientation.

In some aspects, the environmental context is a detected motion of the user device (e.g., a motion of the user). As shown by reference number 430c, the user device selects the authentication component and/or the authentication function according to the detected motion of the user device. The data obtained by the one or more low-power sensors may include motion data. The user device may detect the motion of the user device based on the motion data. For example, the motion data may include data obtained by the gyroscope and/or the accelerometer. The data may indicate an angular velocity, a tilt, and/or an acceleration associated with the user device. The user device may detect the motion of the user device based on the angular velocity, the tilt, and/or the acceleration of the user device.

In some aspects, the data obtained by the one or more low-power sensors includes image data obtained by the vision sensor. The user device may determine the motion of the user device based on the image data. As an example, the image data may obtain a plurality of images. The user device may utilize an object detection process to identify an object depicted in a first image, of the plurality of images, and a location of the object within the first image. The user device may utilize the object detection process to identify the object depicted in a second image, of the plurality of images, and location of the object within the second image. The user device may determine a movement of the object with respect to the user device based on the location of the object within the first image and the location of the object within the second image. For example, the user device may determine the object is moving in a downward direction relative to the user device based on the location of the object within the second image being lower relative to the location of the object within the first image. The user device may determine the motion of the user device based on the movement of the object. For example, the user device may determine that the user device is moving in an upwards direction based on determining that the object is moving in the downward direction relative to the user device.

In some aspects, the environmental context includes a location of the user device. As shown by reference number 430d, the user device selects the authentication component and/or the authentication function according to the location of the user device. The data obtained from the one or more low-power sensors may include location data. The user device may determine a location of the user device based on the location data. The user device may determine an authentication component and/or an authentication function associated with the location of the user device. For example, the user device may determine the authentication component and/or the authentication function based on accessing a data structure (e.g., a database, a table, a list, and/or another type of data structure) storing location information provided by the user. The location information may include information associating locations (e.g., work, home, and/or school) with authentication components and/or authentication functions.

In some aspects, the environmental context of the user device may be a physical configuration of an authentication component relative to the user in the environment of the user device. As an example, the user device may determine the environmental context based on a position of the user's finger relative to a fingerprint sensor of the user device. The data obtained by the one or more low-power sensors may include image data. The user device may detect a finger of the user and/or the fingerprint sensor depicted in an image associated with the image data based on performing an object detection technique. The user device may determine a position of the finger relative to the fingerprint sensor. The user device may determine whether the position of the finger is within a threshold distance of the fingerprint sensor. The user device may determine the environmental context based on whether the position of the finger is within the threshold distance of the fingerprint sensor.

As shown in FIG. 4C, and by reference number 440, the user device activates the authentication component. In some aspects, the user device selects the fingerprint recognition authentication function. For example, the user device may select the fingerprint recognition authentication function based on the orientation of the user device being the horizontal orientation, based on a location of the user's finger relative to the fingerprint sensor, based on the motion of the user device indicating that the user is moving, and/or based on the location of the user device being associated with the fingerprint recognition authentication function. As shown by reference number 440a, the user device activates the fingerprint sensor (e.g., the fingerprint recognition authentication component) based on selecting the fingerprint authentication function.

In some aspects, the user device selects the facial recognition authentication function. For example, the user device may select the facial recognition authentication function based on the orientation of the user device being the vertical orientation, based on a location of the user's finger relative to the fingerprint sensor, based on the motion of the user device indicating that the user device is stationary, and/or based on the location of the user device being associated with the facial recognition authentication function. As shown by reference number 440b, the user device activates the camera (e.g., the facial recognition authentication component) based on selecting the facial authentication function.

In some aspects, the user device selects the pattern and/or PIN recognition authentication function. For example, the user device may select the pattern and/or PIN recognition authentication function based on the orientation of the user device being the horizontal orientation, based on a location of the user's finger relative to the fingerprint sensor, based on the motion of the user device indicating that the user is moving, and/or based on the location of the user device being associated with the pattern and/or PIN recognition authentication function. As shown by reference number 440c, the user device activates the pattern and/or PIN recognition authentication component (e.g., a touchscreen, a display, and/or a keypad of the user device) based on selecting the pattern and/or PIN recognition authentication function.

In some aspects, the user device selects the knock code authentication function. For example, the user device may select the knock code authentication function based on the orientation of the user device being the horizontal orientation, based on a location of the user's finger relative to the fingerprint sensor, based on the motion of the user device indicating that the user is moving, and/or based on the location of the user device being associated with the knock code authentication function. As shown by reference number 440d, the user device activates the knock code authentication component (e.g., a touchscreen, a display, and/or a keypad of the user device) based on selecting the knock code authentication function.

The user device may utilize the activated authentication component to perform the selected authentication function to authenticate the user. The authentication component may perform an authentication function associated with the authentication component based on being activated. The user device may determine a result associated with the authentication component performing the authentication function.

In some aspects, the result may indicate a failure associated with the authentication function authenticating the user. The user device may deactivate the authentication component based on the result indicating the failure associated with the authentication function authenticating the user. The user device may determine another authentication function based on the environmental context. The user device may activate another authentication component associated with the other authentication function to authenticate the user. The other authentication component may perform the other authentication function based on being activated. The user device may determine a result associated with the other authentication component performing the other authentication function.

In some aspects, the result may indicate that the user is authenticated. For example, the result may indicate that a fingerprint of the user matches a stored fingerprint, that a pattern and/or a PIN input by the user matches a stored pattern and/or PIN, and/or the like. As shown by reference number 450, the user device may authenticate the user and may unlock the user device based on authenticating the user.

As indicated above, FIGS. 4A-4C are provided as an example. Other examples may differ from what is described with respect to FIG. 4A-4C.

Figure 5:
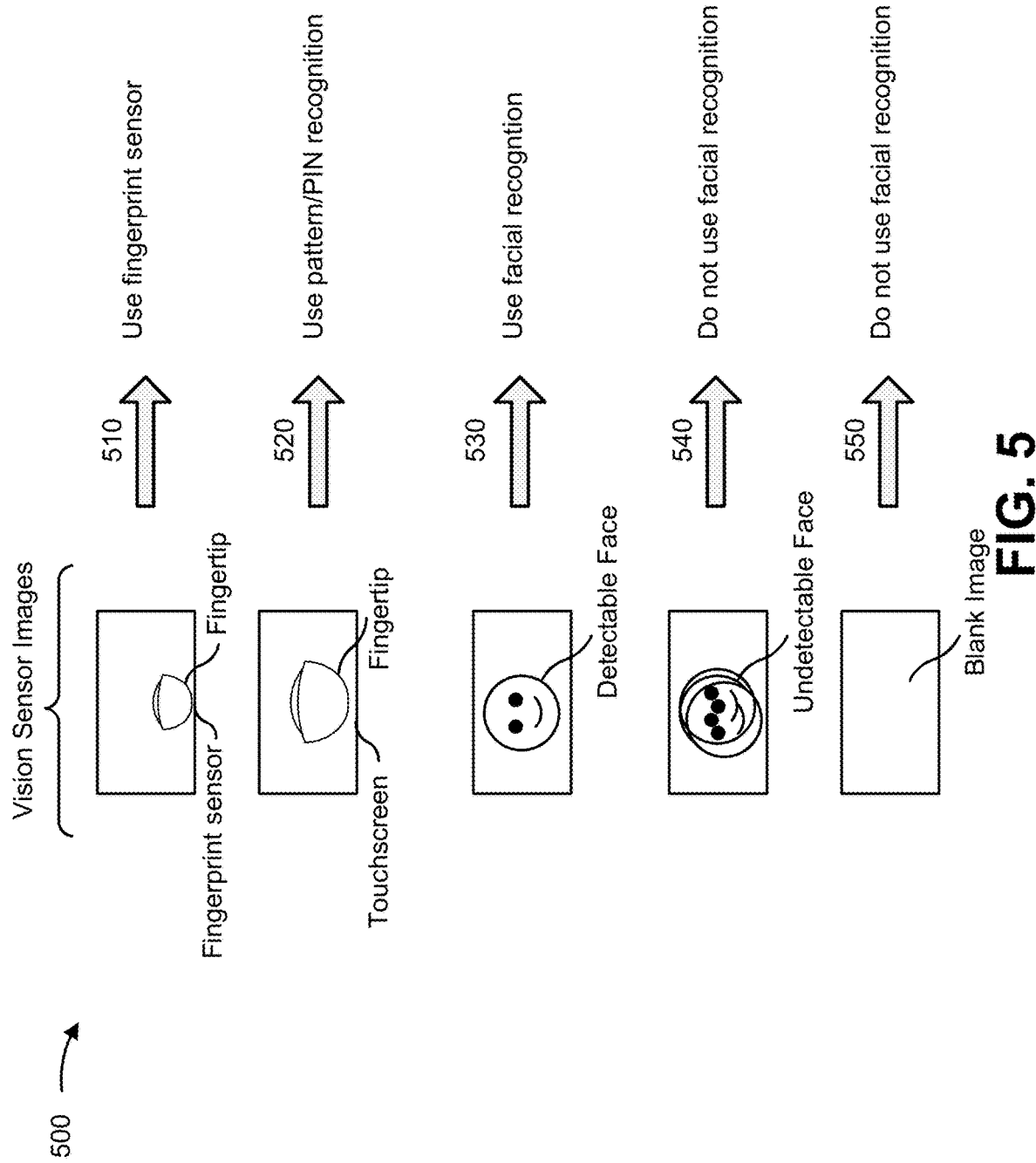

FIG. 5 is a diagram illustrating an example 500 associated with selection of an authentication function according to an environment of a user device, in accordance with various aspects of the present disclosure. As shown in FIG. 5, the user device selects an authentication component and/or an authentication function based on detecting an object depicted in an image captured by a vision sensor of the user device.

In some aspects, the detected object is a finger of the user. The data obtained by the one or more low-power sensors may include image data. The user device may perform object detection processing on the image data. The user device may determine that the finger of the user is depicted in the image data, a size of the finger within the image, and/or a location of the finger within the image based on performing the object detection processing. The user device may select the authentication component and/or the authentication function based on the finger of the user being depicted in the image, based on the size of the finger within the image, and/or based on the location of the finger within the image.

In some aspects, the user device selects the authentication component and/or the authentication function based on the size of the finger within the image. As an example, assume that a distance between the vision sensor and the fingerprint sensor is greater than a distance between the vision sensor and a touchscreen of the user device. The user device may determine that a size of an object depicted in an image captured by the vision sensor may be smaller when the a distance between the object and the fingerprint sensor is less than a distance between the object and the touchscreen (e.g., the object closer to the fingerprint sensor) relative to a size of the object when the distance between object and the fingerprint sensor is greater than a distance between the object and the touchscreen (e.g., the object is closer to the touchscreen) based on the distance between the vision sensor and the fingerprint sensor being greater than the distance between the vision sensor and the touchscreen.

The vision sensor may capture an image of a field of view of the vision sensor. The user device may detect a finger of the user depicted in the image based on performing an object detection technique. The user device may determine that the user is moving the user's finger into contact with the user device (e.g., into contact with the fingerprint sensor and/or the touchscreen) based on the finger being depicted in the image. The user device may determine not to select the facial recognition authentication function based on determining that the user is moving the user's finger into contact with the user device.

The user device may determine whether the finger of the user is closer to the fingerprint sensor or the touchscreen based on the size of the finger within the image. As an example, the user device may determine whether the size of the finger within the image satisfies a size threshold. In some aspects, the user device may determine that the size of the finger within the image fails to satisfy the size threshold. The user device may determine that the finger is closer to the fingerprint sensor rather than the touchscreen based on the size of the finger within the image failing to satisfy the size threshold. As shown by reference number 510, the user device uses the fingerprint sensor (e.g., the user device selects and/or activates the fingerprint recognition authentication function and/or the fingerprint sensor) to authenticate the user based on determining that the finger print is closer to the fingerprint sensor.

In some aspects, the user device determines that the size of the finger within the image satisfies the size threshold. The user device may determine that the finger is closer to the touchscreen rather than the fingerprint sensor based on the size of the finger within the image satisfying the size threshold. As shown by reference number 520, the user device may use the pattern recognition authentication function and/or the PIN recognition authentication function to authenticate the user based on the finger being closer to the touchscreen.

In some aspects, the detected object is a face of the user. For example, the user device may determine whether an image captured by the vision sensor depicts a detectable face of a user based on performing a facial recognition technique. In some aspects, the user device determines that the image depicts a detectable face of a user. For example, the user device may identify a set of facial features (e.g., an eye, a nose, a mouth, and/or another facial feature) depicted in the image. The user device may determine that the image depicts a detectable face of a user based on identifying the set of facial features. As shown by reference number 530, the user device may use the facial recognition authentication function to authenticate the user based on the image containing the detectable face of a user.

In some aspects, the user device determines that the image depicts an undetectable face of a user. For example, as shown in FIG. 5, the user device may be unable to identify a set of facial features depicted in the image based on the image being blurry due to a motion of the user device and/or based on the image being a blank image (e.g., an image depicting dark and/or undetectable objects). The user device may determine that the image depicts an undetectable face of a user based on being unable to identify the set of facial features. As shown by reference numbers 540 and 550, the user device may determine not to use the facial recognition authentication function to authenticate the user based on the image containing the undetectable face of a user. The user device may determine to utilize another authentication function (e.g., the fingerprint recognition authentication function, the pattern recognition authentication function, the PIN recognition authentication function, and/or another type of authentication function) based on determining not to utilize the facial recognition authentication function.

As indicated above, FIG. 5 is provided as an example. Other examples may differ from what is described with respect to FIG. 5.

Figure 6:
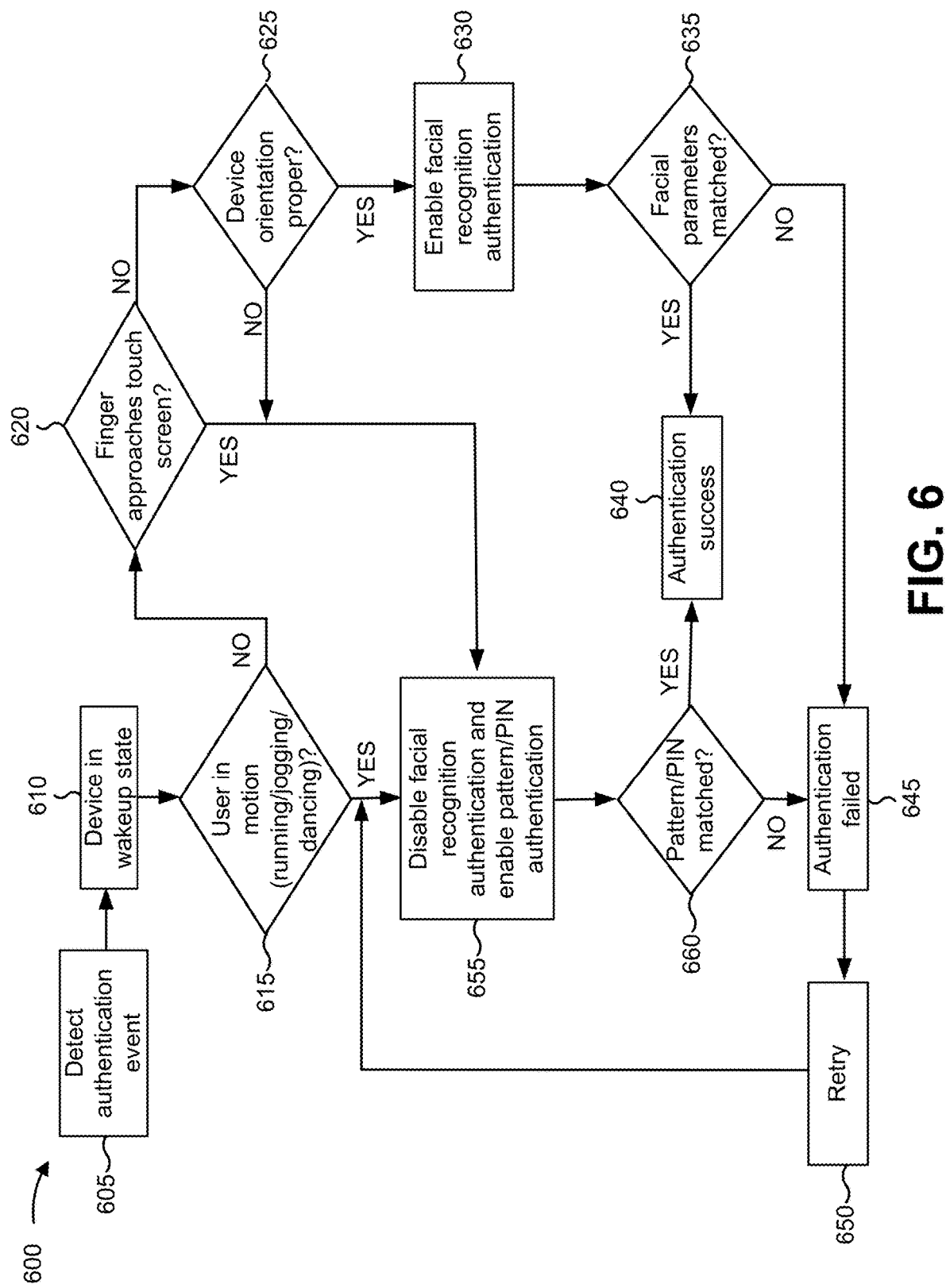

FIG. 6 is a diagram illustrating an example process 600 performed, for example, by a user device, in accordance with various aspects of the present disclosure. Example process 600 is an example where a user device (e.g., user device 110 and/or the like) performs operations associated with selection of an authentication function according to an environment of a user device, as described herein.

As shown in FIG. 6, and by reference number 605, process 600 may include detecting an authentication event. For example, the user device (e.g., using processor 210, memory 215, storage component 220, input component 225, output component 230, communication interface 235, sensor 240, authentication component 245, and/or the like) may detect an authentication event, as described above.

As shown by reference number 610, process 600 may include the user device being in a wakeup state. For example, the user device (e.g., using processor 210, memory 215, storage component 220, input component 225, output component 230, communication interface 235, sensor 240, authentication component 245, and/or the like) may transition to a wakeup state based on detecting the authentication event. For example, the device may be in a sleep state prior to detecting the authentication event. The sleep state may comprise a low-power mode of the device. For example, a display of the device may be inactive and/or the device may be locked. The device may activate the display while remaining locked to transition to the wakeup state based on detecting the authentication event.

As shown by reference number 615, process 600 may include determining whether the user is in motion (e.g., running, jogging, dancing, and/or the like). For example, the user device (e.g., using processor 210, memory 215, storage component 220, input component 225, output component 230, communication interface 235, sensor 240, authentication component 245, and/or the like) may determine whether the user is in motion based on determining a motion of the device, as described above.

In some aspects, the user device determines that the user is not in motion and, as shown by reference number 620, process 600 includes determining whether a finger of the user is approaching a touchscreen of the user device. For example, the user device (e.g., using processor 210, memory 215, storage component 220, input component 225, output component 230, communication interface 235, sensor 240, authentication component 245, and/or the like) may determine whether a finger of the user is approaching a touchscreen of the user device, as described above.

In some aspects, the user device determines that the finger of the user is approaching the touchscreen of the device and process 600 includes disabling facial recognition authentication and enabling pattern and/or PIN authentication, as described below with respect to reference number 655.

In some aspects, the user device determines that the finger of the user is not approaching the touchscreen of the device and, as shown by reference number 625, process 600 includes determining whether an orientation of the user device is proper for performing a facial recognition authentication function. For example, the user device (e.g., using processor 210, memory 215, storage component 220, input component 225, output component 230, communication interface 235, sensor 240, authentication component 245, and/or the like) may determine whether an orientation of the user device is proper for performing a facial recognition authentication function, as described above.

In some aspects, the user device determines that the orientation of the user device is not proper for performing the facial recognition authentication function and process 600 may include disabling facial recognition authentication and enabling pattern and/or PIN authentication, as described below with respect to reference number 655.

In some aspects, the user device determines that the orientation of the user device is proper for performing the facial recognition authentication function and, as shown by reference number 630, process 600 includes enabling a facial recognition authentication function based on the orientation of the user device being proper for performing the facial recognition authentication function. For example, the user device (e.g., using processor 210, memory 215, storage component 220, input component 225, output component 230, communication interface 235, sensor 240, authentication component 245, and/or the like) may enable facial recognition authentication based on the orientation of the user device being proper for performing the facial recognition authentication function, as described above. The user device may perform the facial recognition authentication function based on enabling the facial recognition authentication.

As shown by reference number 635, process 600 may include determining whether the facial parameters of the user match the stored facial parameters. For example, the user device (e.g., using processor 210, memory 215, storage component 220, input component 225, output component 230, communication interface 235, sensor 240, authentication component 245, and/or the like) may determine whether the facial parameters of the user match stored facial parameters.

In some aspects, the user device determines that the facial parameters of the user match the stored facial parameters and, as shown by reference number 640, process 600 may include determining that the user is authenticated based on the facial parameters of the user matching the stored facial parameters. For example, the user device (e.g., using processor 210, memory 215, storage component 220, input component 225, output component 230, communication interface 235, sensor 240, authentication component 245, and/or the like) may determine that the user is authenticated based on the facial parameters of the user matching the stored facial parameters. The user device may perform an unlock operation to unlock the user device based on determining that the user is authenticated.

In some aspects, the user device determines that the facial parameters of the user do not match the stored facial parameters and, as shown by reference number 645, process 600 includes determining that the user is not authenticated based on the facial parameters of the user not matching the stored facial parameters. For example, the user device (e.g., using processor 210, memory 215, storage component 220, input component 225, output component 230, communication interface 235, sensor 240, authentication component 245, and/or the like) may determine that the user is not authenticated based on the facial parameters of the user not matching the stored facial parameters.

As shown by reference number 650, process 600 may include retrying to authenticate the user. For example, the user device (e.g., using processor 210, memory 215, storage component 220, input component 225, output component 230, communication interface 235, sensor 240, authentication component 245, and/or the like) may retry to authenticate the user. In some aspects, the user device may retry to authenticate the user using the facial recognition authentication function (e.g., for a predetermined quantity of attempts and/or for a predetermined amount of time). Alternatively, and/or additionally, the user device may retry to authenticate the user utilizing another authentication technique (e.g., pattern/PIN authentication, as shown in FIG. 6) to authenticate the user.

In some aspects, as shown by reference number 655, process 600 includes disabling the facial recognition authentication and enabling the pattern/PIN authentication. For example, the user device (e.g., using processor 210, memory 215, storage component 220, input component 225, output component 230, communication interface 235, sensor 240, authentication component 245, and/or the like) may disable the facial recognition authentication function and may enable the pattern recognition authentication function and/or the PIN recognition authentication function based on determining that the user is in motion, based on determining that the finger of the user is approaching the touchscreen of the device, based on determining that the device orientation is not proper for performing facial recognition authentication, and/or based on utilizing another authentication technique to authenticate the user, as described above.

As shown by reference number 660, process 600 may include determining whether the pattern and/or PIN input by the user matches a pattern and/or a PIN stored in a memory of the user device. For example, the user device may provide a notification (e.g., via the touchscreen of the user device) requesting the user to enter a pattern and/or a PIN based on enabling the pattern recognition authentication function and/or the PIN recognition authentication function. The user may input the pattern and/or the PIN based on the notification. The user device may compare the input pattern and/or PIN to a pattern and/or PIN stored in a memory of the user device. The user device may determine whether the input pattern and/or PIN matches the stored pattern and/or PIN based on the comparison.

In some aspects, the user device determines that the input pattern and/or PIN matches the stored pattern and/or PIN and, as shown by reference number 640, process 600 may include determining that the user is authenticated. For example, the user device (e.g., using processor 210, memory 215, storage component 220, input component 225, output component 230, communication interface 235, sensor 240, authentication component 245, and/or the like) may determine that the user is authenticated based on determining that the input pattern and/or PIN matches the stored pattern and/or PIN. The user device may unlock the user device to enable the user to access the user device based on determining that the user is authenticated.

In some aspects, the user device determines that the input pattern and/or PIN does not match the stored pattern and/or PIN and, as shown by reference number 645, process 600 may include determining that the user is not authenticated. For example, the user device (e.g., using processor 210, memory 215, storage component 220, input component 225, output component 230, communication interface 235, sensor 240, authentication component 245, and/or the like) may determine that the user is not authenticated based on determining that the input pattern and/or PIN not matching the stored pattern and/or PIN. The user device may prevent the user device from unlocking based on determining that the user is not authenticated. The user device may attempt to authenticate the user based on the pattern recognition authentication function, the PIN recognition authentication function, and/or a different authentication function based on determining that the user is not authenticated, in a manner similar to that described above with respect to reference number 650.

As indicated above, FIG. 6 is provided as an example. Other examples may differ from what is described with respect to FIG. 6.

FIG. 7 is a diagram illustrating an example process 700 performed, for example, by a user device, in accordance with various aspects of the present disclosure. Example process 600 is an example where a user device (e.g., user device 110 and/or the like) performs operations associated with selection of an authentication function according to an environment of a user device, as described herein.

As shown in FIG. 7, process 700 may include detecting an authentication event associated with unlocking a user device (block 710). For example, the user device (e.g., using processor 210, memory 215, storage component 220, input component 225, output component 230, communication interface 235, sensor 240, authentication component 245, and/or the like) may detect an authentication event associated with unlocking a user device, as described above.

As further shown in FIG. 7, process 700 may include determining, based at least in part on sensor data from a sensor of the user device, an environmental context of the user device (block 720). For example, the user device (e.g., using processor 210, memory 215, storage component 220, input component 225, output component 230, communication interface 235, sensor 240, authentication component 245, and/or the like) may determine, based at least in part on sensor data from a sensor of the user device, an environmental context of the user device, as described above.

As further shown in FIG. 7, process 700 may include selecting, from a plurality of authentication functions of the user device, an authentication function based at least in part on the environmental context of the user device (block 730). For example, the user device (e.g., using processor 210, memory 215, storage component 220, input component 225, output component 230, communication interface 235, sensor 240, authentication component 245, and/or the like) may select, from a plurality of authentication functions of the user device, an authentication function based at least in part on the environmental context of the user device, as described above.

As further shown in FIG. 7, process 700 may include activating an authentication component that is associated with the authentication function to authenticate a user in association with unlocking the user device (block 740). For example, the user device (e.g., using processor 210, memory 215, storage component 220, input component 225, output component 230, communication interface 235, sensor 240, authentication component 245, and/or the like) may activate an authentication component that is associated with the authentication function to authenticate a user in association with unlocking the user device, as described above.

Process 700 may include additional implementations, such as any single implementation or any combination of implementations described below and/or in connection with one or more other processes described elsewhere herein.

In a first implementation, detecting the authentication event comprises at least one of detecting an interaction with an input component of the user device, detecting, via motion data from an accelerometer of the user device, a motion of the user device associated with the authentication event, or detecting, via image data of a vision sensor of the user device, that the user is interacting with the user device.

In a second implementation, alone or in combination with the first implementation, the sensor data is associated with a low-power sensor of the user device that facilitates an always-on context detection capability when a user interface of the user device is in a locked state. In a third implementation, alone or in combination with one or more of the first and second implementations, the low-power sensor comprises at least one of a vision sensor of the user device, an accelerometer of the user device, or a gyroscope of the user device. In a fourth implementation, alone or in combination with one or more of the first through third implementations, the authentication component is a separate component of the user device from the sensor.

In a fifth implementation, alone or in combination with one or more of the first through fourth implementations, the environmental context comprises at least one of a physical orientation of the user device, a location of the user device, or a physical configuration of the authentication component relative to the user in an environment of the user device.

In a sixth implementation, alone or in combination with one or more of the first through fifth implementations, the sensor data comprises image data, and determining the environmental context comprises detecting, according to an object detection technique, a finger of the user depicted in an image associated with the image data, determining a position of the finger of the user relative to the authentication component, and determining that the position of the finger is within a threshold distance of the authentication component, wherein the authentication component is selected based at least in part on determining that the position of the finger is within the threshold distance.

In a seventh implementation, alone or in combination with one or more of the first through sixth implementations, the sensor comprises a low-power vision sensor and the authentication component comprises at least one of a fingerprint sensor of the user device, a knock code component of the user device, or a passcode component of the user device.

In an eighth implementation, alone or in combination with one or more of the first through seventh implementations, the environmental context is determined based at least in part on a machine learning model that is trained based at least in part on historical sensor data associated with corresponding historical usage of one or more of the plurality of authentication functions.

In a ninth implementation, alone or in combination with one or more of the first through eighth implementations, process 700 includes prior to selecting the authentication function, determining, based at least in part on the environmental context, that a default authentication function is to be bypassed, and preventing activation of a default authentication component that is associated with the default authentication function. In a tenth implementation, alone or in combination with one or more of the first through ninth implementations, the default authentication component comprises a camera of the user device and the authentication component comprises at least one of a fingerprint sensor of the user device, a knock code component of the user device, or a passcode component of the user device.

In an eleventh implementation, alone or in combination with one or more of the first through tenth implementations, the authentication function is a primary authentication function and the authentication component is a primary authentication component, further comprising detecting a failure associated with the primary authentication function authenticating the user, deactivating, based at least in part on the failure, the primary authentication component, determining, based at least in part on the environmental context, a secondary authentication function, and activating a secondary authentication component associated with the secondary authentication function to authenticate the user.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
 detecting an authentication event associated with unlocking a user device;
 determining, based at least in part on sensor data from a sensor of the user device, an environmental context of the user device;
 selecting, from a plurality of authentication functions of the user device, a facial recognition authentication function based at least in part on the environmental context of the user device,
  wherein the environmental context indicates one or more of:
   whether the user device is still or in motion,
   an amount of ambient light surrounding the user device,
   an orientation of the user device, or
   a position of a finger relative to a fingerprint sensor; and
 activating an authentication component that is associated with the facial recognition authentication function to authenticate a user in association with unlocking the user device.

2. The method of claim 1, wherein detecting the authentication event comprises at least one of:
 detecting an interaction with an input component of the user device,
 detecting, via motion data from an accelerometer of the user device, a motion of the user device associated with the authentication event, or
 detecting, via image data of a vision sensor of the user device, that the user is interacting with the user device.

3. The method of claim 1, wherein the sensor data is associated with a low-power sensor of the user device that facilitates an always-on context detection capability when a user interface of the user device is in a locked state.

4. The method of claim 3, wherein the low-power sensor comprises at least one of:
 a vision sensor of the user device,
 an accelerometer of the user device, or
 a gyroscope of the user device.

5. The method of claim 1, wherein the authentication component is a separate component of the user device from the sensor.

6. The method of claim 1,
 wherein the sensor data comprises image data,
 wherein determining the environmental context comprises:
  detecting, according to an object detection technique, the finger depicted in an image associated with the image data, and
  determining the position of the finger relative to the fingerprint sensor, and wherein selecting the facial recognition authentication function comprises:
   determining whether the position of the finger is within a threshold distance of the fingerprint sensor, and
   selecting the facial recognition authentication function based at least in part on determining whether the position of the finger is within the threshold distance of the fingerprint sensor.

7. The method of claim 1,
 wherein the sensor comprises a low-power vision sensor, and
 wherein the authentication component comprises a camera.

8. The method of claim 1, wherein the environmental context is determined further based at least in part on a machine learning model that is trained based at least in part on historical sensor data associated with corresponding historical usage of one or more of the plurality of authentication functions.

9. The method of claim 1, further comprising:
 determining, based at least in part on the environmental context, that a default authentication function is to be bypassed; and
 preventing activation of a default authentication component that is associated with the default authentication function.

10. The method of claim 1,
 wherein the authentication component is a primary authentication component, and
 wherein the method further comprises:
  deactivating, based at least in part on a failure, the primary authentication component;
  determining a secondary authentication function; and
  activating a secondary authentication component associated with the secondary authentication function to authenticate the user.

11. A user device, comprising:
 one or more memories; and
 one or more processors, communicatively coupled to the one or more memories, configured to:
  detect an authentication event associated with unlocking the user device;
  determine, based at least in part on sensor data, an environmental context of the user device;
  determine whether to select, from a plurality of authentication functions of the user device, a facial recognition authentication function based at least in part on the environmental context of the user device,
   wherein the environmental context indicates one or more of:
    whether the user device is still or in motion,
    an amount of ambient light surrounding the user device,
    an orientation of the user device, or
    a position of a finger relative to a fingerprint sensor; and
  activate, based on a determination of whether to select the facial recognition authentication function, an authentication component to authenticate a user in association with unlocking the user device.

12. The user device of claim 11, wherein the one or more processors, when detecting the authentication event, are configured to at least one of:
 detect an interaction with an input component of the user device,
 detect, via motion data from an accelerometer of the user device, a motion of the user device associated with the authentication event, or
 detect, via image data of a vision sensor of the user device, that the user is interacting with the user device.

13. The user of claim 11, wherein the sensor data is associated with a low-power sensor of the user device that facilitates an always-on context detection capability when a user interface of the user device is in a locked state.

14. The user device of claim 11,
wherein the sensor data comprises image data,
wherein, when determining the environmental context, the one or more processors are configured to:
  detect, according to an object detection technique the finger depicted in an image associated with the image data, and
  determine the position of the finger relative to the fingerprint sensor, and
wherein, when determining whether to select the authentication function, the one or more processors are configured to:
  determine whether to select the facial recognition authentication function based at least in part on the position of the finger relative to the fingerprint sensor.

15. The user device of claim 11, wherein the environmental context is determined further based at least in part on a machine learning model that is trained based at least in part on historical sensor data associated with corresponding historical usage of one or more of the plurality of authentication functions.

16. The user device of claim 11, wherein the one or more processors are further configured to:
  prior to selecting the authentication function, determining, based at least in part on the environmental context, that a default authentication function is to be bypassed; and
  preventing activation of a default authentication component that is associated with the default authentication function.

17. The user device of claim 11,
wherein the facial recognition authentication function is a primary authentication function or a secondary authentication function,
wherein the authentication component is a primary authentication component, and
wherein the one or more processors are further configured to:
  detect a failure associated with the primary authentication function authenticating the user;
  deactivate, based at least in part on the failure, the primary authentication component;
  determine, based at least in part on the environmental context, the secondary authentication function; and
  activate a secondary authentication component associated with the secondary authentication function to authenticate the user.

18. The user device of claim 11,
wherein the environmental context indicates the orientation of the user device, and
wherein the orientation of the user device is a horizontal orientation or a vertical orientation.

19. The user device of claim 11,
wherein the environmental context indicates the orientation of the user device, and
wherein, when determining whether to select the facial recognition authentication function, the one or processors are configured to:
  determine, based on the orientation of the user device, whether the user is within a field of view of a camera used to obtain an image of the user for performing the facial recognition authentication function.

20. The user device of claim 11,
wherein the environmental context indicates that the user device is in motion,
wherein, when determining whether to select the facial recognition authentication function, the one or processors are configured to:
  determine to select the facial recognition authentication function based on the user device not being in motion.

21. The user device of claim 11, wherein, when determining whether to select the facial recognition authentication function, the one or processors are configured to:
  determine whether to select the facial recognition authentication function based on the environmental context and based on preference information indicated by the user.

22. A non-transitory computer-readable medium storing a set of instructions, the set of instructions comprising:
  one or more instructions that, when executed by one or more processors of a user device, cause the user device to:
    detect an authentication event associated with unlocking the user device;
    determine, based at least in part on sensor data, an environmental context of the user device;
    select, from a plurality of authentication functions of the user device, a facial recognition authentication function based at least in part on the environmental context of the user device,
      wherein the environmental context indicates one or more of:
        whether the user device is still or in motion,
        an amount of ambient light surrounding the user device,
        an orientation of the user device, or
        a position of a finger relative to a fingerprint sensor; and
    activate an authentication component based on selecting the facial recognition authentication function.

23. The non-transitory computer-readable medium of claim 22, wherein the sensor data is associated with a low-power sensor of the user device that facilitates an always-on context detection capability when a user interface of the user device is in a locked state.

24. The non-transitory computer-readable medium of claim 23, wherein the low-power sensor comprises at least one of:
  a vision sensor of the user device,
  an accelerometer of the user device, or
  a gyroscope of the user device.

25. The non-transitory computer-readable medium of claim 22,
wherein the sensor data comprises image data, and
wherein the environmental context is based on the finger being depicted in an image associated with the image data.

26. An apparatus, comprising:
  means for detecting an authentication event associated with unlocking a user device that includes the apparatus;
  means for determining, based at least in part on sensor data, an environmental context of the user device;
  means for selecting, from a plurality of authentication functions of the user device, a facial recognition authentication function based at least in part on the environmental context of the user device; and means for activating an authentication component that is associated with the facial recognition authentication function to authenticate a user in association with unlocking the user device.

27. The apparatus of claim 26, wherein the sensor data is associated with a low-power sensor of the user device that facilitates an always-on context detection capability when a user interface of the user device is in a locked state.

28. The apparatus of claim 27, wherein the low-power sensor comprises at least one of:
- a vision sensor of the user device,
- an accelerometer of the user device, or
- a gyroscope of the user device.

29. The apparatus of claim 26, wherein the environmental context is determined further based at least in part on a machine learning model that is trained based at least in part on historical sensor data associated with corresponding historical usage of one or more of the plurality of authentication functions.

30. The apparatus of claim 26,
wherein the facial recognition authentication function is a primary authentication function or a secondary authentication function,
wherein the authentication component is a primary authentication component or a secondary authentication component, and
wherein the apparatus further comprises:
- means for detecting a failure associated with the primary authentication function authenticating the user;
- means for deactivating, based at least in part on the failure, the primary authentication component;
- means for determining, based at least in part on the environmental context, a secondary authentication function; and
- means for activating a secondary authentication component associated with the secondary authentication function to authenticate the user.

* * * * *